United States Patent
Satchell, Jr.

(10) Patent No.: US 6,193,781 B1
(45) Date of Patent: Feb. 27, 2001

(54) METHOD OF SMELTING IRON ORE

(75) Inventor: Donald Prentice Satchell, Jr., Berkeley Heights, NJ (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/192,784

(22) Filed: Nov. 16, 1998

Related U.S. Application Data

(60) Provisional application No. 60/069,106, filed on Dec. 9, 1997.

(51) Int. Cl.[7] ................................................. C21B 11/00
(52) U.S. Cl. ................................................. 75/453; 75/502
(58) Field of Search ........................................... 75/453, 502

(56) References Cited

U.S. PATENT DOCUMENTS

| | | | |
|---|---|---|---|
| 4,699,655 | * 10/1987 | Milionis | 75/492 |
| 5,613,997 | * 3/1997 | Satchell, Jr. | 75/446 |
| 5,800,592 | * 9/1998 | den Hartog et al. | 75/502 |

* cited by examiner

*Primary Examiner*—Melvyn Andrews
(74) *Attorney, Agent, or Firm*—Salvatore P. Pace

(57) ABSTRACT

A method of smelting iron ore in which iron oxide and hot char are introduced into a primary reactor to reduce the iron oxide and thereby form a molten pool of elemental iron and iron oxide slag. A carbon containing substance, comprising fixed carbon and a hydrocarbon containing volatile matter, is introduced into a secondary reactor. The hydrocarbon containing volatile matter is partially oxidized within the secondary reactor to produce the hot char and a fuel gas comprising hydrocarbons, carbon monoxide, carbon dioxide, steam, and hydrogen with a $CO_2:CO$ molar ratio greater than about 0.25. The fuel gas is burned within the primary reactor so that a projected flame is produced and the projected flame is directed into the iron oxide slag of the molten pool.

5 Claims, 1 Drawing Sheet

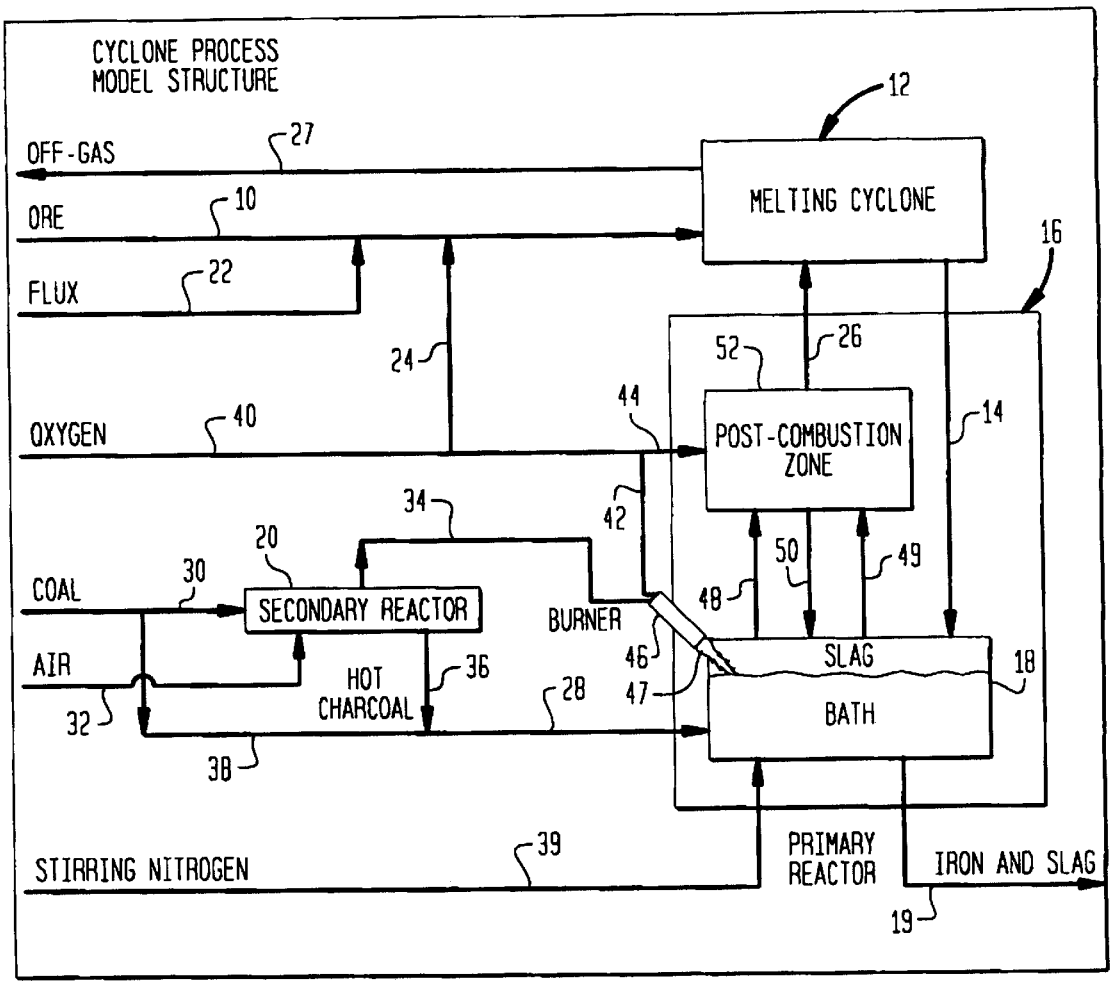

METHOD OF SMELTING IRON ORE

RELATED CASES

This application claims priority from Provisional Patent Application U.S. Ser. No. 60/069,106, filed Dec. 9, 1997, which is hereby incorporated herein by reference.

BACKGROUND OF THE INVENTION

The present invention relates to a method of smelting iron ore by reducing the iron ore in the presence of fixed carbon to produce elemental iron as a molten pool. More particularly the present invention relates to such a method in which the iron ore is reduced in a reactor and the fixed carbon is introduced into the reactor as hot char produced from coal that contains volatile substances. Even more particularly, the present invention relates to such a method in which volatile substances are partially oxidized to produce a fuel gas which is fed to a burner that is in turn fired into the molten pool.

Iron ore is reduced to molten iron in a bath by a variety of known processes. In all of such processes, the iron ore is reduced by supplying the iron ore and a carbonaceous reductant to a reactor in which the iron ore is reduced while being heated to form a molten pool of elemental iron and iron oxide slag. The carbonaceous reductant can be in the form of coal. Upon introduction into the molten bath, the coal would be converted in to a hot char. The principle component of the hot char are fixed carbon and ash. During the formation of this hot char, volatile substances formed from the volatile matter within the coal feed are vaporized. The vaporization of these volatile substances is endothermic and hence, not thermally efficient. In addition, it very difficult to efficiently mix this gaseous volatile matter with a gaseous oxidant and efficiently transfer the heat of combustion to the melt.

The foregoing processes require high quality coal, to wit: coal having a low volatile content. Such coal is not used in a thermally inefficient manner in that heat energy is lost in vaporizing the volatile substances. Moreover, the combustion of the volatile substances above the melt to heat the molten iron is also thermally inefficient because the heat energy is not directed into the molten iron. Therefore conventional bath smelting processes use the more costly low volatile matter coal to minimize the concentration of this troublesome component. This invention, on the other hand, allows bath smelting process to heat the molten bath using the coal volatile matter components more efficiently than with more expensive fixed carbon. Therefore, this invention makes the less expensive volatile matter components a more useful component to heat the melt than the more expensive fixed carbon components up to the bath heating requirement. However, for both this invention and the prior art, the fixed carbon components remain vital for reduction of the molten iron oxide to elemental iron.

As will be discussed, the present invention allows iron ore to be reduced in a more cost efficient manner than prior art methods because it allows a lower quality coal to be used to form the char and also permits the combustion of the volatile substances to be directed into the molten iron in a thermally efficient manner.

SUMMARY OF THE INVENTION

In accordance with the present invention, iron ore is smelted by introducing iron ore and hot char into a primary reactor to reduce the iron ore and thereby form a molten pool of elemental iron and an iron oxide slag. A carbon containing substance, comprising fixed carbon and a hydrocarbon containing volatile matter, is introduced into a secondary reactor. The hydrocarbon containing volatile matter is partially oxidized within the secondary reactor to produce the hot char and a fuel gas comprising hydrocarbons, carbon monoxide, carbon dioxide, and hydrogen. The carbon dioxide to carbon monoxide ratio in the fuel gas is greater than about 0.25. The hot char is introduced into the primary reactor and the fuel gas is burned within the primary reactor so that a projected flame is produced. The flame is directed into the iron oxides slag. As a result, a molten pool can be supported with less expensive coal, namely, coal with a high volatility content. Moreover, less coal is utilized than in prior art methods.

BRIEF DESCRIPTION OF THE DRAWINGS

While the specification concludes with claims distinctly pointing out the subject matter that Applicant regards as his invention, it is believed the invention will be better understood when taken in connection with the sole FIGURE which is a schematic of an apparatus for carrying out a method in accordance with the present invention.

DETAILED DESCRIPTION

With reference to the FIGURE, Iron ore feed 10 is melted within a reaction zone, preferably in the form of a melting cyclone 12. The melted iron ore, indicated by reference numeral 14, is then introduced into a primary reactor 16 where the iron ore is reduced to elemental iron. The reduction takes place in a bath 18 of the primary reactor 16 which is also loaded with char produced in a secondary reactor 20 and produced in the primary reactor from the direct coal feed 38. The resultant iron and slag are drawn as indicated by reference numeral 19.

Melting cyclone 12 is a known device in which the iron ore feed 10 in the form of fine solids is tangentially introduced with a flux feed 22 and an oxygen stream 24. Fuel in the form of a converter gas stream 26 is introduced from the bottom to melt and partly reduce the ore. The cyclonic action serves to separate the resultant liquid 14 and off-gas 27 melting cyclone 12 product streams. The resulting iron rich liquid 14 is introduced into primary reactor 16. An off-gas stream 27 is produced from combustion of converter gas stream 26. It is understood, however, that such purification of the ore and heat treatment, while preferred, is optional. Furthermore, an extension of primary reactor 16 could be used to achieve the same goals as melting cyclone 12. Alternatively iron ore 10 could be fed directly to the primary reactor 16.

The iron oxide 14 is reduced within primary reactor 16 by the introduction of a reductant by way of a combined coal and char feed 28. A hot char 36 is produced within secondary reactor 20 which is fed with a coal feed 30. Coal feed 30 has a high volatile content and is partially oxidized by an oxidant stream 32. The oxidant stream may consist of air, enriched air, or substantially pure oxygen and steam. The oxygen content of this oxidant feed stream is adjusted to maintain the secondary reactor operating temperature in the range of 600 to 1200° C. The secondary reactor is preferably a fluidized bed for granular coal feeds with a narrow particle size, a spouted bed reactor for granular coal feeds with broader particle size distributions, or an entrained flow reactor with pulverized coal feeds. Partial oxidation of the volatile matter from the coal feed 30 produces a fuel gas stream 34 and hot char 36. The average residence time of the coal the secondary reactor should be roughly equivalent to the time required to remove the volatile matter from the coal in order to remove about eight percent of the volatile matter from the coal in order to minimize fixed carbon oxidation. The time required to remove the volatile matter can be determined by experiment and is primarily a function of the coal particle size. Fuel gas stream 34 comprises hydrocarbons, carbon monoxide, carbon dioxide, steam, and hydrogen. The carbon dioxide to carbon monoxide molar ratio should be greater than about 0.25 to minimize fouling of the equipment. A coal feed 38 can be combined with hot char fed to the primary reactor 16 or fed separately to the primary reactor 16. The ratio of the coal 38 fed directly to the primary reactor 16 and the coal 30 feed to the secondary reactor is used to control the primary reactor 16 bath 18 temperature. Increasing the stream 30 to stream 38 coal feed ratio increases the bath temperature, A stirring nitrogen stream 39 is also introduced in a manner known in the art into primary reactor 16.

An incoming oxygen stream 40 is divided into subsidiary streams 24, 42, and 44. Subsidiary stream 42 is introduced along with fuel gas stream 34 into a burner 46. The fuel gas burns to form a projected flame 47 which is directed into the top slag layer of bath 18. Thus, the fuel gas produced from the high volatile content coal is advantageously used in supplying heat to molten underlying elemental iron layer of pool 18. The overlying slag layer transfers the heat from the projected flame 47 to the underlying molten iron layer with minimum iron oxidation. Burner 46 can be any type of burner that is capable of producing a projected flame.

Heat can also be supplied to support the melted state of the elemental iron within pool 18 by lancing oxygen as subsidiary stream 44 into or over the top slag layer. The combustion gases, designated by reference numeral 48, also rise into the top slag layer and any ullage space in converter 16. The resultant carbon monoxide and hydrogen containing off-gas stream 49 also rises to burn in the presence of the incoming oxygen within subsidiary stream 44 to produce heat, shown by reference number 50, which supports the molten iron. The slag and ullage space is collectively referred to as a post combustion zone 52. The off-gas of such post combustion zone 52 is used to form primary reactor gas stream 26.

The following is a calculated example of the operation of the apparatus of the FIGURE in accordance with the present invention.

TABLE

Representative Stream Properties

| Reference Number | T, °C. | P, bar | Components | kg/1000 KgFe |
|---|---|---|---|---|
| 10. Iron ore feed | 25° C. | 3.2 | $Fe_2O_3$ | 1,369 |
| | | | $Al_2O_3$ | 43 |
| | | | $SiO_2$ | 67 |
| 14. Molten ore and flux from cyclone | 1,600° C. | 3.2 | FeO | 1 |
| | | | $Al_2O_3$ | 1 |
| | | | CaO | 0 |
| 19. Iron & Slag | 1,550° C. | 3.2 | Iron | 1,000 |
| | | | Slag | 233 |
| 22. Flux feed | 25° C. | 3.2 | CaO(s) | 81 |
| 24. Cyclone $O_2$ feed | 25° C. | 3.2 | $O_2$ | 404 |
| 26. Converter gas | 1,800° C. | 3.2 | $N_2(g)$ | 424 |
| | | | $H_2$ | 23 |
| | | | $H_2S(g)$ | 4 |
| | | | $H_2O(g)$ | 113 |
| | | | CO | 698 |
| | | | $CO_2$ | 594 |
| 27. Cyclone off-gas | 1,800° C. | 3.2 | $N_2$ (g) | 424 |
| | | | $H_2$ | 2 |
| | | | $H_2S(g)$ | 4 |
| | | | $H_2O$ | 306 |
| | | | CO | 51 |
| | | | $CO_2$ | 1,610 |
| 30. Coal feed to secondary Reactor | 25° C. | 3.2 | Volatile Matter | 84 |
| | | | Fixed Carbon | 191 |
| | | | Ash | 14 |
| 32. Oxidant | 25° C. | 3.2 | $O_2(g)$ | 84 |

TABLE-continued

Representative Stream Properties

| Reference Number | T, °C. | P, bar | Components | kg/1000 KgFe |
|---|---|---|---|---|
| | | | $N_2(g)$ | 294 |
| 34. Secondary Reactor off-gas | 1,119° C. | 3.2 | Hydrocarbons | 106 |
| | | | $N_2$ | 296 |
| | | | $H_2$ (g) | 4 |
| | | | $H_2O$ (g) | 49 |
| | | | CO (g) | 29 |
| | | | $CO_2$ (g) | 46 |
| | | | $H_2S$ (g) | 2 |
| 36. Hot Char | 1,039° C. | 3.2 | Hydrocarbons | 13 |
| | | | Fixed Carbon | 109 |
| | | | Ash | 14 |
| 38. Primary reactor coal feed | 25° C. | 3.2 | Volatile Matter | 98 |
| | | | Fixed Carbon | 222 |
| | | | Ash | 17 |
| 42. $O_2$ feed to burner | 25° C. | 3.2 | $O_2$ | 500 |

While the present invention has been described with reference to a preferred embodiment, numerous changes, additions and omissions may be made with departing from the spirit and scope of the present invention.

I claim:

1. A method of smelting iron ore comprising:
   introducing iron oxide and hot char into a primary reactor to reduce the iron oxide and thereby form a molten pool of elemental iron and iron oxide slag;
   introducing a carbon containing substance comprising fixed carbon and a hydrocarbon containing volatile matter into a secondary reactor;
   partially oxidizing the hydrocarbon containing volatile matter within said secondary reactor to produce said hot char and a fuel gas stream comprising hydrocarbons, carbon monoxide, carbon dioxide, steam, and hydrogen with a $CO_2$:CO molar ratio greater than about 0.25;
   burning said fuel gas stream within said primary reactor so that a projected flame is produced; and
   directing said projected flame into iron oxide slag of the said molten pool.

2. The method of claim 1, wherein the primary reactor produces a gas stream comprising hydrogen and carbon monoxide that is combusted in a post-combustion zone therein thereby producing heat and a converter gas stream;
   said converter gas stream, an oxidant, along with flux and said iron oxide, are fed into a reaction zone wherein said converter gas stream is combusted, thereby partially reducing and melting said iron oxide, and the molten iron oxide is separated from the combustion products; and
   said iron oxide as a liquid is fed into said primary reactor.

3. Method of claim 2 in which the reaction zone is a cyclone.

4. The method of claim 1, wherein:
   said carbon containing substance is introduced into said secondary reactor as part of a coal feed; and
   another part of said coal feed and said hot char are introduced into said primary reactor.

5. The method of claim 2, wherein:
   said carbon containing substance is introduced into said secondary reactor as part of a coal feed; and
   another part of said coal feed and said hot char are introduced into said primary reactor.

\* \* \* \* \*